United States Patent
Schmitt et al.

(10) Patent No.: US 7,129,690 B1
(45) Date of Patent: Oct. 31, 2006

(54) AT-SPEED ON-CHIP SHORT CLOCK CYCLE MONITORING SYSTEM AND METHOD

(75) Inventors: Jonathan Schmitt, Eden Prairie, MN (US); Steve Wurzer, Blaine, MN (US)

(73) Assignee: LSI Logic Corporation, Milpitas, CA (US)

( * ) Notice: Subject to any disclaimer, the term of this patent is extended or adjusted under 35 U.S.C. 154(b) by 0 days.

(21) Appl. No.: 11/321,747

(22) Filed: Dec. 29, 2005

(51) Int. Cl.
G01R 23/12 (2006.01)
G01R 23/175 (2006.01)
G06F 1/04 (2006.01)

(52) U.S. Cl. .............................. 324/76.53; 324/76.54; 327/292

(58) Field of Classification Search ............. 324/76.53, 324/76.54; 327/292
See application file for complete search history.

(56) References Cited

U.S. PATENT DOCUMENTS

2005/0012524 A1* 1/2005 Green et al. .................... 327/3
2005/0063502 A1* 3/2005 Ware et al. .................. 375/354

* cited by examiner

Primary Examiner—Vincent Q. Nguyen
Assistant Examiner—Amy He
(74) Attorney, Agent, or Firm—Suiter·West·Swantz PC LLO

(57) ABSTRACT

The present invention provides a system and method for monitoring a short clock cycle on a semiconductor chip. The system includes a phase-locked loop (PLL) for receiving a reference clock as input and for outputting a PLL clock out. The system includes a delay-locked loop (DLL) for receiving the PLL clock out as input and for outputting a DLL phase offset clock. The DLL is locked to a frequency of the PLL clock out. The system may include an edge comparator for receiving the PLL clock out and the DLL phase offset clock as input. The edge comparator is suitable for monitoring each edge of the PLL clock out and each edge of the DLL phase offset clock, and for reporting a short clock cycle when an edge of the PLL clock out comes before an edge of the DLL phase offset clock.

17 Claims, 2 Drawing Sheets

AT-SPEED ON-CHIP SHORT CLOCK CYCLE MONITORING SYSTEM AND METHOD

FIELD OF THE INVENTION

The present invention generally relates to the field of integrated circuits, particularly to an at-speed on-chip short clock cycle monitoring system and method.

BACKGROUND OF THE INVENTION

A phase-locked loop (PLL) is a closed-loop feedback control system that maintains a generated signal in a fixed phase relationship to a reference signal. Since an integrated cicuit (IC) can hold a complete PLL building block, the technique is widely used in modern electronic devices, with signal frequencies from a fraction of a cycle per second up to many gigahertz.

Typically a PLL may include a lock detector that monitors REF (reference) and FB (feedback) edges to signal when the PLL is in lock. This lock signal is often used as a way to judge if there is a short clock cycle (i.e., a fast clock signal) in order to avoid corrupted data in an IC. However, this application of the lock signal may not work properly because the lock detector is not actually monitoring the clock out signal. In addition, the resolution of the lock detector may be considerably larger than the timing closure window.

Conventionally, the short clock cycle is avoided by calculating the statistical probability of the short clock cycle and increasing the timing uncertainty such that the rate of such an occurrence is acceptable to the design of an IC. However, using this approach, the IC will eventually get a bit error. Furthermore, the current calculations are based on silicon measurements that are not available in the early product life.

Thus, it would be desirable to provide a system and method which may effectively address the foregoing-described problems.

SUMMARY OF THE INVENTION

In an aspect, the present invention provides a method for monitoring a short clock cycle on a semiconductor chip. A delay-locked loop (DLL) is driven with a clock out of a phase-locked loop (PLL). The DLL is locked to a frequency of the PLL clock out. A DLL phase offset clock is output by the DLL. Each edge of the PLL clock out and each edge of the DLL phase offset clock are monitored. A short clock cycle may be reported when an edge of the PLL clock out comes before an edge of the DLL phase offset clock.

In an additional aspect, the present invention provides a system for monitoring a short clock cycle on a semiconductor chip. The system includes a phase-locked loop (PLL) for receiving a reference clock as input and for outputting a PLL clock out. The system includes a delay-locked loop (DLL) for receiving the PLL clock out as input and for outputting a DLL phase offset clock. The DLL is locked to a frequency of the PLL clock out. The system may include an edge comparator for receiving the PLL clock out and the DLL phase offset clock as input. The edge comparator is suitable for monitoring each edge of the PLL clock out and each edge of the DLL phase offset clock, and for reporting a short clock cycle when an edge of the PLL clock out comes before an edge of the DLL phase offset clock.

It is to be understood that both the foregoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

The present invention brings a clock monitoring circuit on chip and uses a delay-locked loop (DLL) for on-chip timing checking. The DLL may be driven with the clock out (CKOUT) of the PLL. The DLL locks to the nominal output frequency of the PLL and provides a compare clock (i.e., DLL phase offset clock). The conventional statistical calculation may be performed to get an idea of how much phase offset the output of the DLL needs to provide. This may be 11.25, 15, or 22.5 degrees (3.125%, 4.17%, and 6.25% of the cycle time, respectively) of the clock cycle, depending on the DLL, PLL speed, and jitter profile. The system designer may then uses that value for timing closure. Each edge of the PLL clock out and the DLL phase offset clock are monitored. If an edge of the PLL clock out comes before an edge of the DLL phase offset clock, a bit error flag signal is raised, and the system may respond accordingly. If desired, two DLLs may be used to check for both short and long clock cycles.

Figure 1:
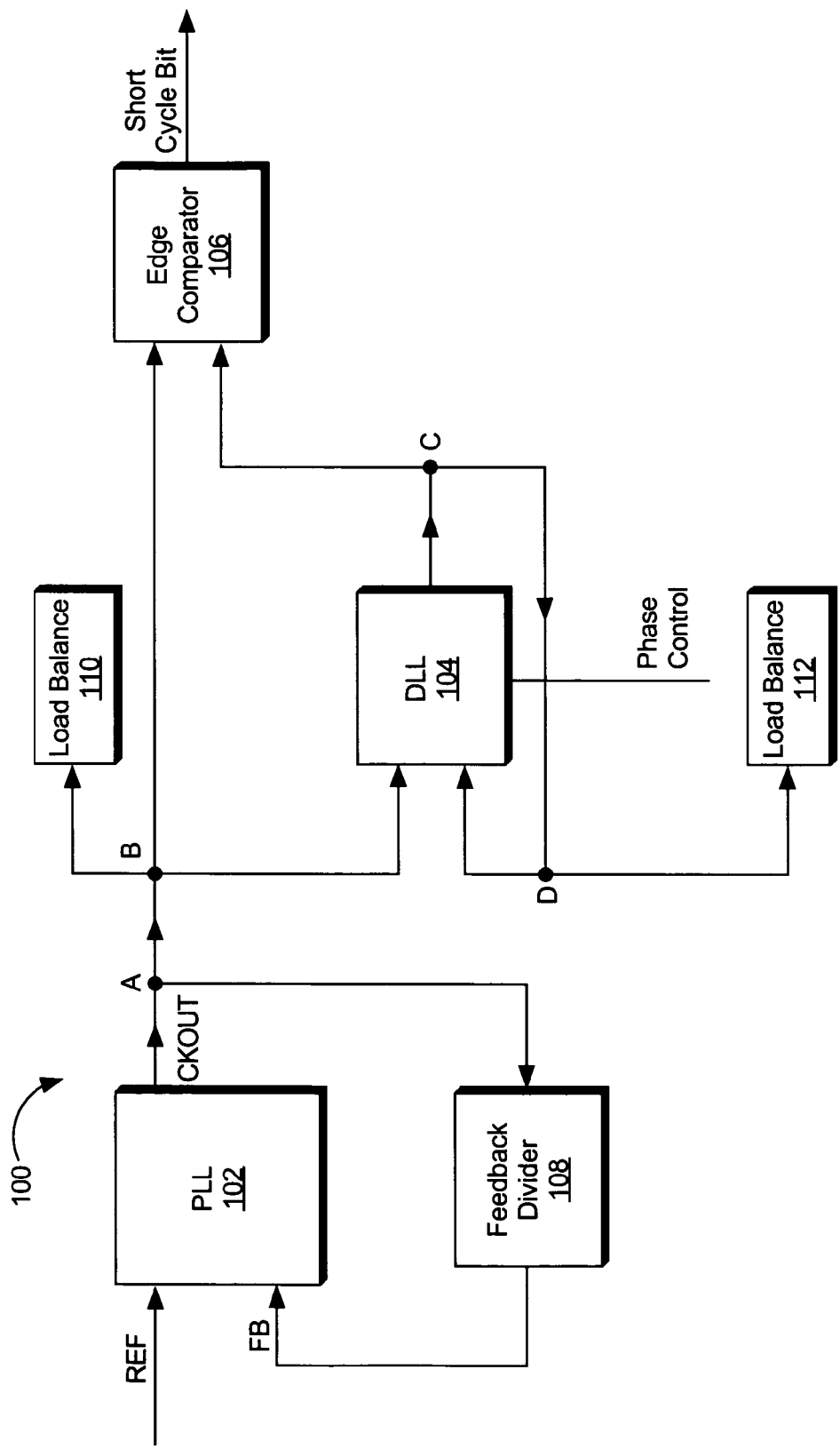
FIG. 1 is a schematic diagram illustrating a system for monitoring a short clock cycle on a semiconductor chip in accordance with an exemplary embodiment of the present invention.

Referring now to FIG. 1, a system 100 for monitoring a short clock cycle on a semiconductor chip in accordance with an exemplary embodiment of the present invention is shown. The system 100 includes a PLL 102, a DLL 104 and an edge comparator 106. The PLL 102 may be implemented using either analog or digital circuitry. The PLL 102 receives a reference clock (REF) as input and outputs a PLL clock out (CKOUT) to node A. Preferably, the system 100 includes a feedback divider 108, which is connected to node A for receiving the PLL clock out as input and outputs a feedback signal to the PLL 102 as feedback input (FB). The feedback divider 108 may be suitable for making the PLL clock out a rationale multiple of the reference clock (REF).

Node B is connected to node A for receiving the PLL clock out. The DLL 104 is connected to node B for receiving the PLL clock out as input and outputs a DLL phase offset clock to node C. Node D is connected to node C for receiving the DLL phase offset clock and provides the DLL phase offset clock to the DLL 104 as the feedback clock. The DLL 104 may be implemented using either analog or digital circuitry. The DLL 104 works by inserting delay between the input clock (i.e., the PLL clock out) and the feedback clock (i.e., the DLL phase offset clock) until the two rising edges align, putting the two clocks 360 degrees out of phase (meaning they are in phase). After the edges from the input clock line up with the edges from the feedback clock, the DLL 104 locks. Thus, the DLL 104 may be locked to a frequency of the PLL clock out. The phase offset of the DLL phase offset clock may be based on a calculation of a statistical probability of a short clock cycle. Preferably, the phase offset of the DLL phase offset clock is 11.25, 15 or 22.5 degrees (3.125%, 4.17%, and 6.25% of the cycle time, respectively) of a clock cycle.

The edge comparator 106 is connected to node B for receiving the PLL clock out as input, and is connected to node C for receiving the DLL phase offset clock as input. The edge comparator 106 is suitable for monitoring each edge of the PLL clock out and each edge of the DLL phase offset clock. The edge comparator 106 may be suitable for reporting a short clock cycle when an edge of the PLL clock out comes before an edge of the DLL phase offset clock, e.g., by raising a bit error flag signal or the like. Alternatively, the edge comparator 106 may be suitable for reporting a long clock cycle (i.e., a slow clock signal) when an edge of the PLL clock out comes after an edge of the DLL phase offset clock.

Preferably, the system 100 includes a first load balance 110 and a second load balance 112 for balancing loading on each signal into the DLL 104. The first load balance 110 is connected to node B and receives the PLL clock out as input. The second load balance 112 is connected to node D and receives the DLL phase offset clock as input. Preferably, the first load balance 110 and the second load balance 112 are dummy gate loading.

Those of ordinary skill in the art will understand that the system 100 may alternatively include two DLLs to check for both short and long clock cycles without departing from the scope and spirit of the present invention.

Figure 2:
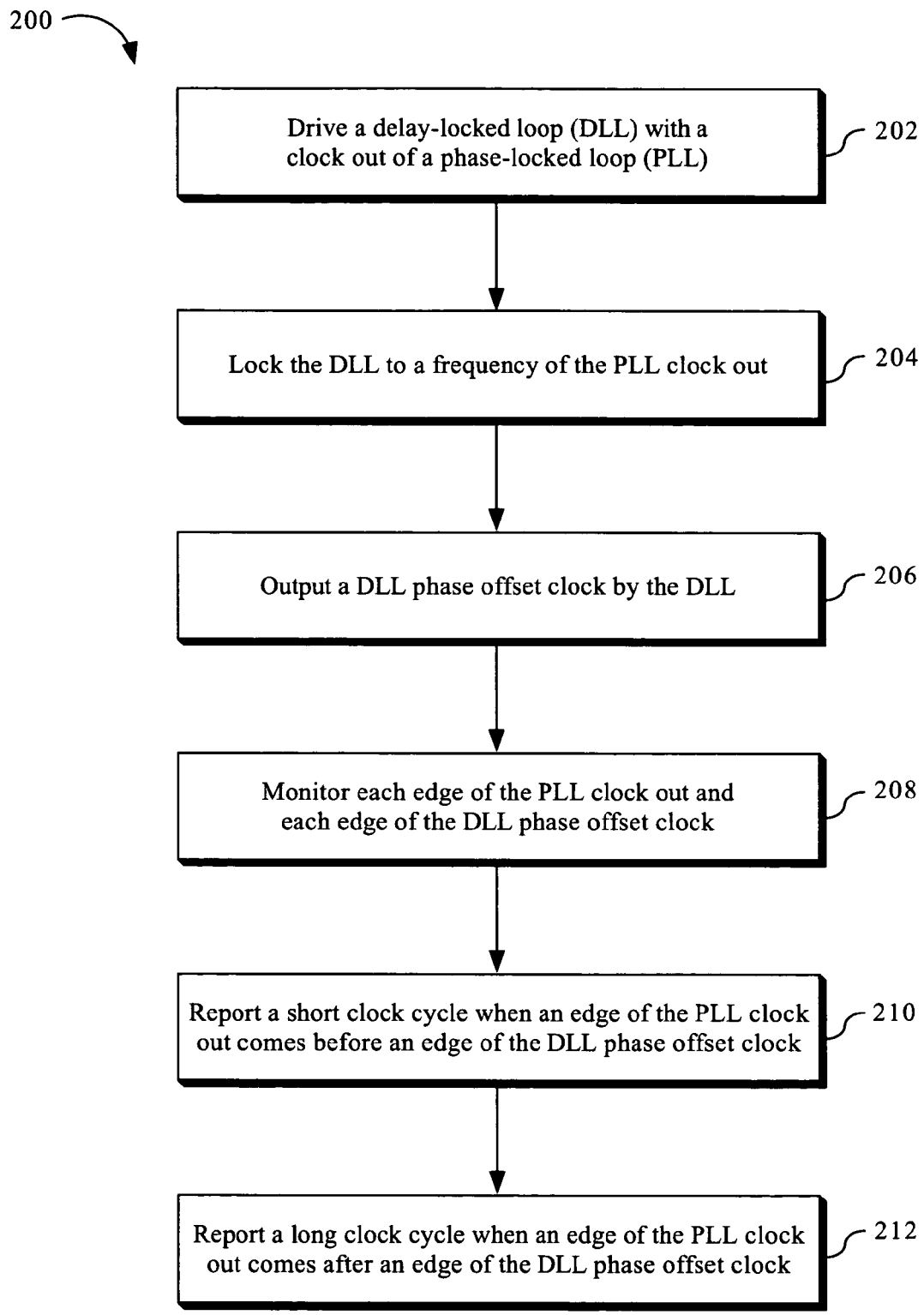
FIG. 2 is a flowchart of a method for monitoring a short clock cycle on a semiconductor chip in accordance with an exemplary embodiment of the present invention.

FIG. 2 shows a method 200 for monitoring a short clock cycle on a semiconductor chip in accordance with an exemplary embodiment of the present invention. A delay-locked loop (DLL) may be driven with a clock out of a phase-locked loop (PLL) 202. The DLL may be locked to a frequency of the PLL clock out 204. A DLL phase offset clock may be output by the DLL 206. The phase offset of the DLL phase offset clock may be based on a calculation of a statistical probability of a short clock cycle. Preferably, the phase offset of the DLL phase offset clock is 11.25, 15 or 22.5 degrees (3.125%, 4.17%, and 6.25% of the cycle time, respectively) of a clock cycle.

Each edge of the PLL clock out and each edge of the DLL phase offset clock may be monitored (e.g., by an edge comparator or the like) 208. A short clock cycle may be reported when an edge of the PLL clock out comes before an edge of the DLL phase offset clock (e.g., by raising a bit error flag signal or the like) 210. Alternatively, a long clock cycle may be reported when an edge of the PLL clock out comes after an edge of the DLL phase offset clock 212.

The present invention may have the following advantages. First, it provides an instantaneous clock watchdog on a chip to monitor a short clock cycle and/or a long clock cycle. Moreover, timing of the clock watchdog is the same as the clock uncertainty as used during timing closure. Thus, the present invention may provide an at-speed on-chip short clock cycle monitoring system and method.

It is understood that the specific order or hierarchy of steps in the processes disclosed is an example of exemplary approaches. Based upon design preferences, it is understood that the specific order or hierarchy of steps in the processes may be rearranged while remaining within the scope of the present invention. The accompanying method claims present elements of the various steps in a sample order, and are not meant to be limited to the specific order or hierarchy presented.

It is believed that the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A method for monitoring a short clock cycle on a semiconductor chip, comprising:
   driving a delay-locked loop (DLL) with a clock out of a phase-locked loop (PLL);
   locking said DLL to a frequency of said PLL clock out;
   outputting a DLL phase offset clock by said DLL; and
   monitoring each edge of said PLL clock out and each edge of said DLL phase offset clock;
   reporting a short clock cycle when an edge of said PLL clock out comes before an edge of said DLL phase offset clock.

2. The method of claim 1, wherein said reporting comprises raising a bit error flag signal.

3. The method of claim 1, wherein said monitoring is implemented by an edge comparator.

4. The method of claim 1, wherein phase offset of said DLL phase offset clock is based on a calculation of a statistical probability of a short clock cycle.

5. The method of claim 4, wherein said phase offset of said DLL phase offset clock is 11.25, 15 or 22.5 degrees of a clock cycle.

6. The method of claim 1, further comprising reporting a long clock cycle when an edge of said PLL clock out comes after an edge of said DLL phase offset clock.

7. A system for monitoring a short clock cycle on a semiconductor chip, comprising:
   means for driving a delay-locked loop (DLL) with a clock out of a phase-locked loop (PLL);
   means for locking said DLL to a frequency of said PLL clock out;
   means for outputting a DLL phase offset clock by said DLL; and
   means for monitoring each edge of said PLL clock out and each edge of said DLL phase offset clock;
   means for reporting a short clock cycle when an edge of said PLL clock out comes before an edge of said DLL phase offset clock.

8. The system of claim 7, wherein said means for reporting comprises means for raising a bit error flag signal.

9. The system of claim 7, wherein phase offset of said DLL phase offset clock is based on a calculation of a statistical probability of a short clock cycle.

10. The system of claim 9, wherein said phase offset of said DLL phase offset clock is 11.25, 15 or 22.5 degrees of a clock cycle.

11. The system of claim 7, further comprising means for reporting a long clock cycle when an edge of said PLL clock out comes after an edge of said DLL phase offset clock.

12. A system for monitoring a short clock cycle on a semiconductor chip, comprising:
   a phase-locked loop (PLL) for receiving a reference clock as input and for outputting a PLL clock out;

a delay-locked loop (DLL) for receiving said PLL clock out as input and for outputting a DLL phase offset clock, said DLL being locked to a frequency of said PLL clock out; and an edge comparator for receiving said PLL clock out and said DLL phase offset clock as input, wherein said edge comparator is suitable for monitoring each edge of said PL L clock out and each edge of said DLL phase offset clock and for reporting a short clock cycle when an edge of said PLL clock out comes before an edge of said DLL phase offset clock.

13. The system of claim 12, wherein said edge comparator is suitable for reporting a long clock cycle when an edge of said PLL clock out comes after an edge of said DLL phase offset clock.

14. The system of claim 12, further comprising a feedback divider for receiving said PLL clock out as input and for outputting a feedback signal to said PLL as feedback input, said feedback divider being suitable for making said PLL clock out a rationale multiple of said reference clock.

15. The system of claim 12, further comprising a first load balance and a second load balance for balancing loading on each signal into said DLL, said first load balance receiving said PLL clock out as input, and said second load balance receiving said DLL phase offset clock as input.

16. The system of claim 15, wherein said first load balance is dummy gate loading.

17. The system of claim 15, wherein said second load balance is dummy gate loading.

* * * * *